(12) United States Patent
Thakur et al.

(10) Patent No.: US 9,471,120 B1
(45) Date of Patent: Oct. 18, 2016

(54) POWER MANAGEMENT CONTROLLER FOR INTEGRATED CIRCUIT

(71) Applicant: FREESCALE SEMICONDUCTOR, INC., Austin, TX (US)

(72) Inventors: Nishant Singh Thakur, Noida (IN); Akshat Gupta, Noida (IN); Manmohan Rana, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/810,460

(22) Filed: Jul. 27, 2015

(51) Int. Cl.
*G06F 1/24* (2006.01)
*G06F 1/26* (2006.01)
*G05F 1/625* (2006.01)

(52) U.S. Cl.
CPC . *G06F 1/24* (2013.01); *G06F 1/26* (2013.01); *G05F 1/625* (2013.01); *G06F 1/266* (2013.01)

(58) Field of Classification Search
CPC ............. G06F 1/24; G06F 1/26; G06F 1/266
USPC .................................... 713/1, 300, 310, 340
See application file for complete search history.

(56) References Cited

U.S. PATENT DOCUMENTS

| | | | | |
|---|---|---|---|---|
| 5,508,601 A | * | 4/1996 | Good | H02H 7/065 322/37 |
| 5,737,612 A | * | 4/1998 | Ansel | G06F 1/24 327/143 |
| 6,473,852 B1 | * | 10/2002 | Hanjani | G06F 1/24 327/143 |
| 7,432,748 B2 | | 10/2008 | Khan et al. | |
| 7,526,674 B2 | * | 4/2009 | Bailey | G06F 1/28 307/64 |
| 7,564,279 B2 | * | 7/2009 | Tang | H03K 17/223 327/142 |
| 7,696,795 B2 | * | 4/2010 | Choi | H03K 17/223 327/142 |
| 7,788,515 B2 | * | 8/2010 | Wong | G06F 1/26 327/198 |
| 8,004,321 B2 | | 8/2011 | Imtiaz | |
| 8,788,861 B2 | | 7/2014 | Haj-Yihia | |
| 2010/0164469 A1 | | 7/2010 | Bansal | |
| 2012/0054525 A1 | | 3/2012 | Walker | |

* cited by examiner

*Primary Examiner* — Mark Connolly
(74) *Attorney, Agent, or Firm* — Charles E. Bergere

(57) ABSTRACT

A power management controller (PMC) for resetting various voltage domains of an integrated circuit (IC) generates and transmits first and second voltage domain input signals to first and second voltage domains, respectively, and generates corresponding reset signals for resetting the first and second voltage domains. The PMC generates a first master reset signal indicative of resetting the first and second voltage domains when the first and second voltage domains are booting. The PMC generates a second master reset signal indicative of resetting the first and second voltage domains when the IC is in a functional mode. The PMC determines whether the first and second voltage domains are non-functional and if at least one is non-functional, then the PMC masks a respective one of the first and second reset signals.

17 Claims, 11 Drawing Sheets

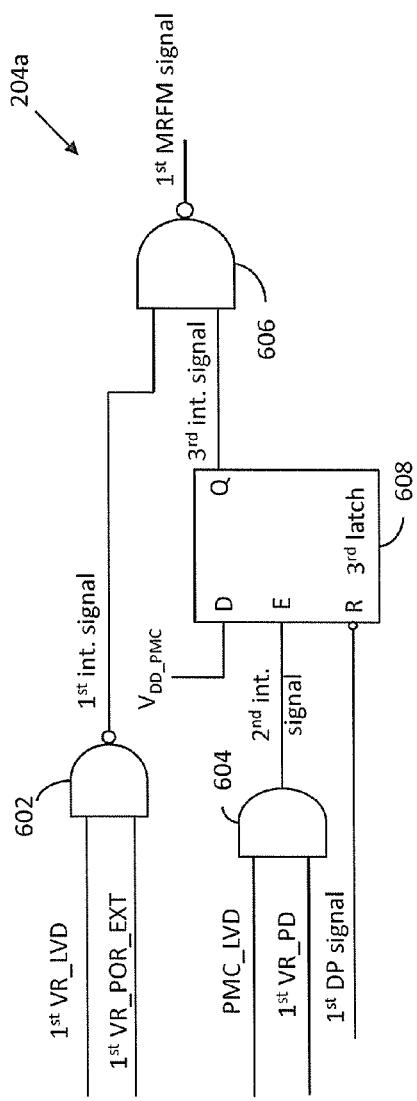
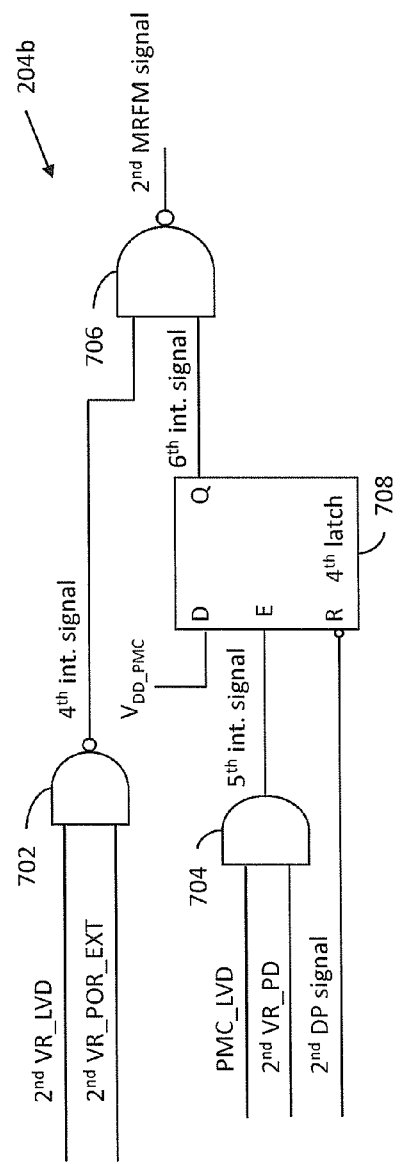
FIG. 6
FIG. 7

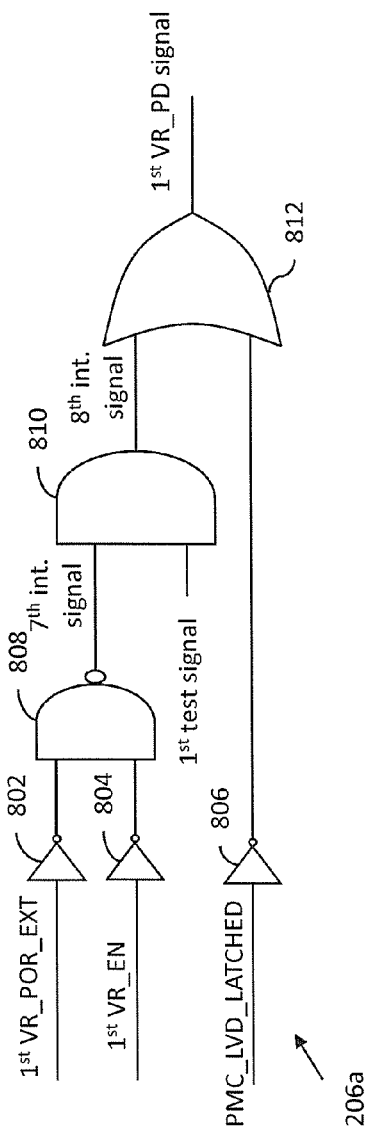
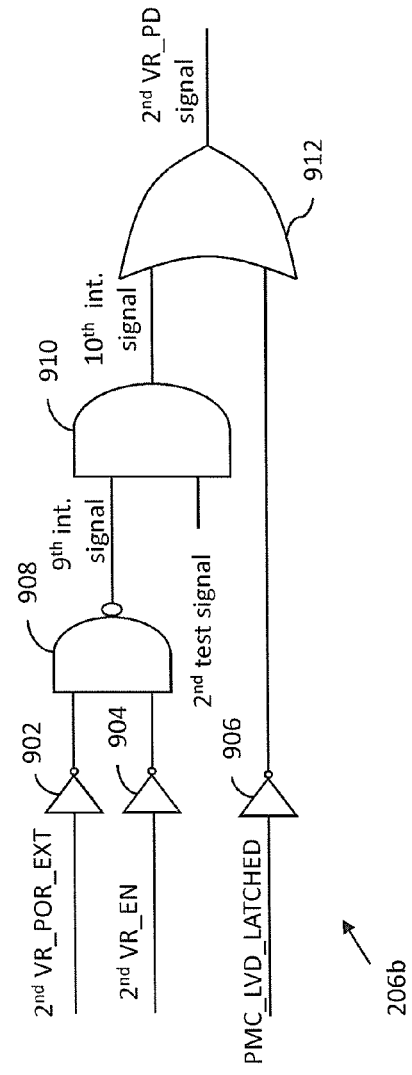
FIG. 8
FIG. 9

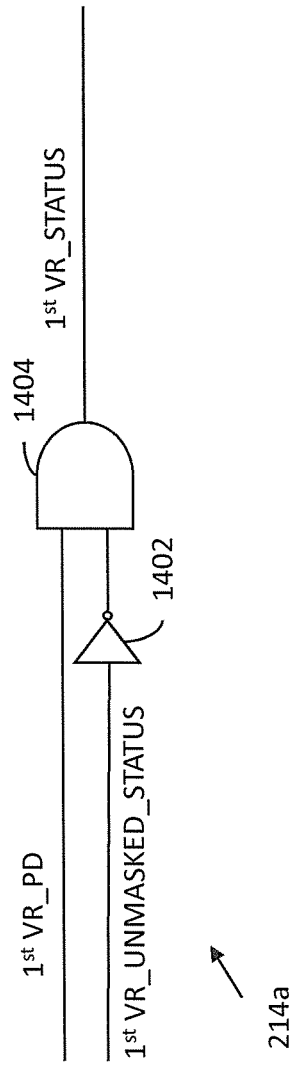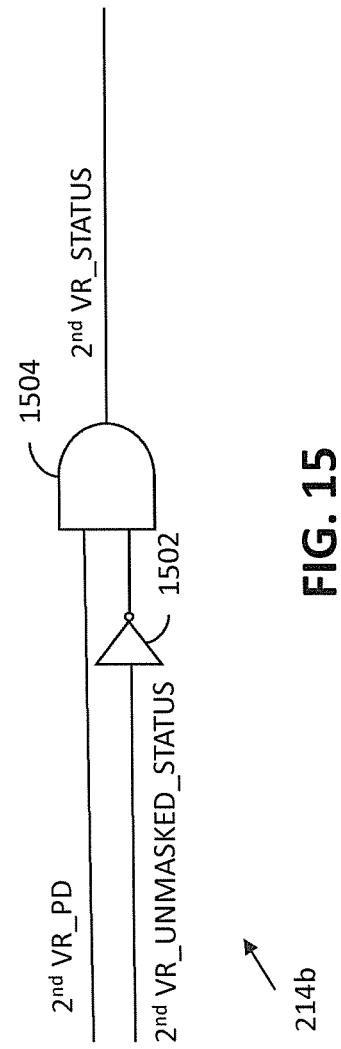

POWER MANAGEMENT CONTROLLER FOR INTEGRATED CIRCUIT

BACKGROUND

The present invention relates generally to integrated circuits, and, more particularly, to a power management controller (PMC) for an integrated circuit (IC).

Integrated circuits include various analog and digital circuits such as operational amplifiers, sensors, logic circuits, and registers. With advancements in semiconductor technology, the number of circuits has increased dramatically. The increase in the number of circuits on a chip has increased power consumption, resulting in an increase in the heat generated by the IC, which can adversely affect the performance of the IC. To reduce power consumption, certain circuitry is placed in separate domains and these domains are separately powered with different voltage supplies (i.e., voltage supplies with different voltage levels). Thus, ICs include multiple voltage domains that can be switched ON and OFF based on operational requirements.

Such an IC also may be configured to operate in various operational modes, such as functional mode, sleep mode, deep sleep mode, etc., while the voltage domains may include high, low, and ultra-low power voltage domains. A high power voltage domain operates at a high voltage level, i.e., receives a voltage supply at a high voltage level and an ultra-low power voltage domain operates at a low voltage level. For example, the high voltage level may be 1.2 volts (V) and the low voltage level may be 1.125V. When the IC is powered up, the voltage domains are reset to a predetermined state based on predetermined values stored in registers of the voltage domains.

The IC includes a PMC for supplying voltage signals to the voltage domains. The PMC includes multiple voltage regulators for providing multiple voltage signals at various voltage levels. For example, the PMC may include a high power voltage regulator (HPREG) for providing a high voltage signal to the high power voltage domain, a low power voltage regulator (LPREG) for providing a low voltage signal to the low power voltage domain, and an ultra-low power voltage regulator (ULPREG) for providing an ultra-low power voltage signal to the ultra-low power voltage domain. Further, the PMC generates domain reset signals for resetting the voltage domains. For example, the PMC may generate a high power domain reset signal for resetting the high power voltage domain, a low power domain reset signal for resetting the low power voltage domain, and an ultra-low power domain reset signal for resetting the ultra-low power voltage domain.

The voltage domains must be reset synchronously when the IC is powered up. If the voltage domains are not reset synchronously, the IC may enter a meta-stable state. Hence, the domain reset signals must be generated synchronously. However, due to varying propagation delays and on-chip variations, the domain reset signals may be skewed causing the voltage domains to be reset asynchronously, which can degrade the performance of the IC.

It would be advantageous to have a PMC that synchronously resets multiple voltage domains and prevents malfunctioning of the IC due to non-synchronous resetting of the voltage domains.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 6 is a schematic block diagram of a first master-reset-in-functional-mode module of the voltage controller of FIG. 2 in accordance with an embodiment of the present invention;

FIG. 7 is a schematic block diagram of a second master-reset-in-functional-mode module of the voltage controller of FIG. 2 in accordance with an embodiment of the present invention;

FIG. 8 is a schematic block diagram of a first voltage regulator enable module of the voltage controller of FIG. 2 in accordance with an embodiment of the present invention;

FIG. 9 is a schematic block diagram of a second voltage regulator enable module of the voltage controller of FIG. 2 in accordance with an embodiment of the present invention;

FIG. 14 is a schematic block diagram of a first voltage regulator status module of the voltage controller of FIG. 2 in accordance with an embodiment of the present invention;

FIG. 15 is a schematic block diagram of a second voltage regulator status module of the voltage controller of FIG. 2 in accordance with an embodiment of the present invention.

DETAILED DESCRIPTION

Figure 1:
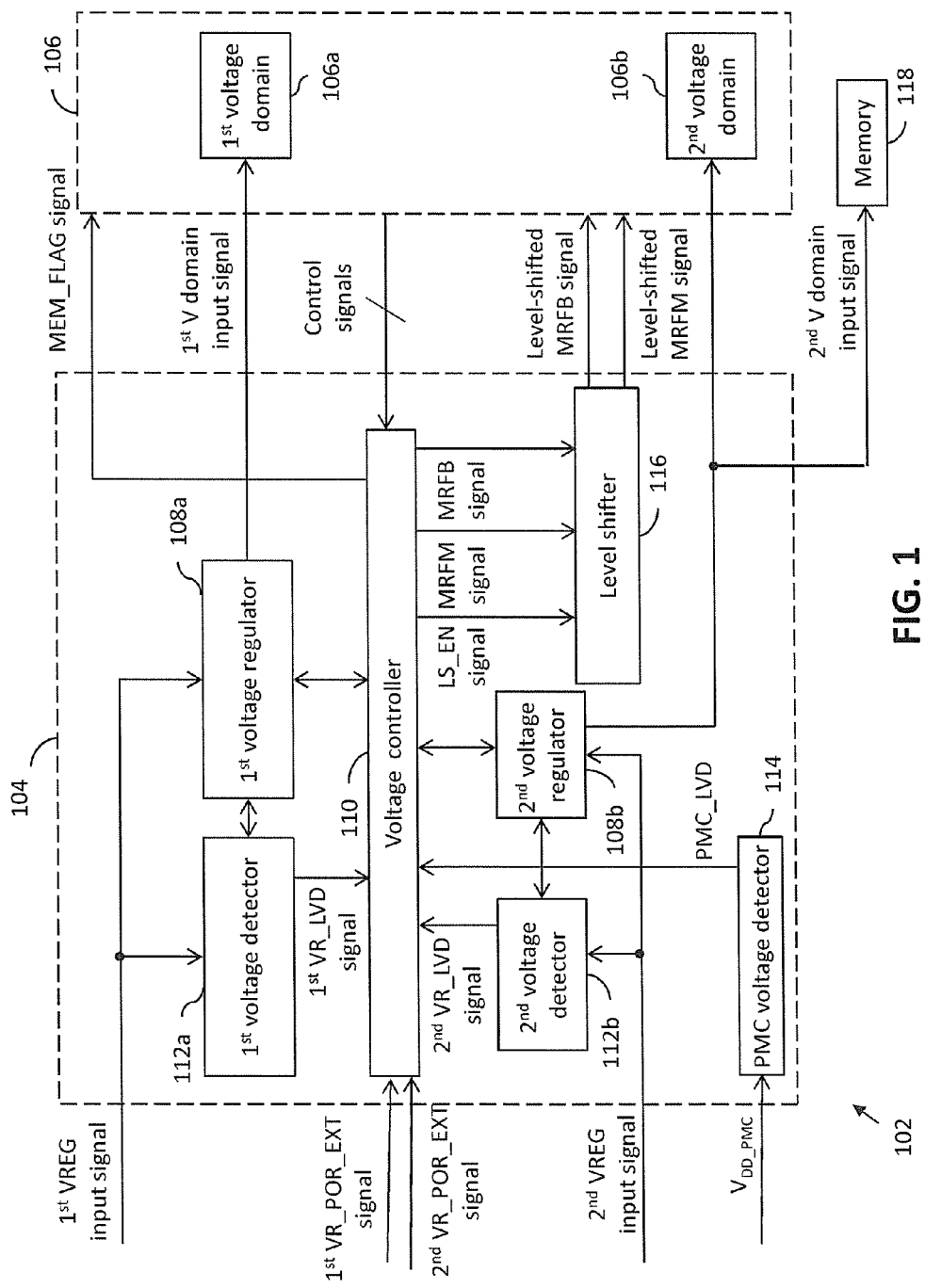
FIG. 1 is a schematic block diagram of an IC in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment of the present invention, a power management controller (PMC) is provided. The PMC is connected to a memory and a plurality of voltage domains of an integrated circuit, including first and second voltage domains that receive first and second voltage domain input signals, respectively. The memory receives a memory input signal. The PMC includes first and second voltage regulators, first and second voltage detectors, and a voltage controller. The first and second voltage regulators receive first and second voltage regulator input signals, respectively, and generate the first and second voltage domain input signals, respectively. The first and second voltage detectors receive and monitor the first and second voltage regulator input signals, respectively, and generate first and second voltage detector signals indicative of voltage levels of the first and second voltage regulator input signals, respectively. The voltage controller receives a set of input signals including the first and second voltage detector signals, first and second external power-on-reset (POR) signals indicative of resetting the first and second voltage domains, respectively, and first and second regulator status signals indicative of operational conditions of the first and second voltage regulators, respectively. The voltage controller generates a master reset signal based on the set of input signals, wherein the master reset signal is indicative of resetting the first and second voltage domains.

In another embodiment of the present invention, a method for resetting a plurality of voltage domains including first and second voltage domains of an integrated circuit is provided. The method includes providing first and second voltage domain input signals to the first and second voltage domains, respectively. First and second external power-on-reset (POR) signals are received for resetting the first and second voltage domains, respectively. Voltage levels of the first and second voltage domain input signals are determined. The method further includes generating first and second reset signals based on the first and second external POR signals and the voltage levels of the first and second voltage domain input signals. The first and second reset signals are indicative of resetting the first and second voltage domains, respectively. The method further includes generating a master reset signal based on the first and second reset signals. The master reset signal is indicative of resetting the first and second voltage domains.

Various embodiments of the present invention provide a PMC for resetting multiple voltage domains of an IC, including first and second voltage domains. The PMC provides first and second voltage domain input signals to the first and second voltage domains, respectively. The PMC receives first and second external POR signals indicative of resetting the first and second voltage domains, respectively. The PMC determines voltage levels of the first and second voltage domain input signals. The PMC generates first and second reset signals based on the first and second external POR signals and the voltage levels of the first and second voltage domain input signals, respectively. The first and second reset signals are indicative of resetting the first and second voltage domains, respectively. The PMC generates a master reset signal based on the first and second reset signals. The master reset signal is indicative of resetting the first and second voltage domains.

In one embodiment, the PMC generates multiple reset signals corresponding to the voltage domains of the IC. Further, the PMC generates the master reset signal based on the multiple reset signals. The master reset signal is indicative of resetting the voltage domains simultaneously. Hence, the voltage domains are reset synchronously when the voltage domains are powered up and when the IC is in at least one of a functional mode and a test mode, thereby preventing the IC from asynchronous resetting of the voltage domains. Hence, the PMC prevents malfunctioning of the IC due to asynchronous resetting of the voltage domains. Further, the PMC is compatible with an IC with a single voltage domain as well as an IC with multiple voltage domains, thereby providing flexibility for connecting the PMC to an IC.

Referring now to FIG. 1, a schematic block diagram of an integrated circuit (IC) 102 in accordance with an embodiment of the present invention is shown. The IC 102 includes a power management controller (PMC) 104 and a plurality of voltage domains 106 including first and second voltage domains 106a and 106b (collectively referred to as "voltage domains 106"). The PMC 104 includes first and second voltage regulators 108a and 108b, a voltage controller 110, first and second voltage detectors 112a and 112b, a PMC voltage detector 114, and a level shifter 116. The IC 102 further includes a memory 118. The PMC 104 is connected to the voltage domains 106 and the memory 118. The voltage domains 106 may include analog and digital circuitry, such as amplifiers, sensors, logic circuits, and registers. The first voltage domain 106a includes circuitry that operates based on a first voltage domain input signal while the second voltage domain 106b includes circuitry that operates based on a second voltage domain input signal.

The IC 102 is configured to operate in various operational modes, such as high power, low power and ultra-low power modes. In the example, the first voltage domain 106a is a high power voltage domain that operates on a high voltage signal and the second voltage domain 106b is a low power voltage domain 106b that operates on a low voltage signal. For example, in one embodiment, a voltage level of the high voltage signal is 1.2 volts (V) and a voltage level of a low voltage signal is a 1.125V.

The first voltage regulator 108a is connected to the voltage controller 110, the first voltage domain 106a, and the first voltage detector 112a. The first voltage regulator 108a receives a first voltage regulator input signal and generates the first voltage domain input signal. In one embodiment, the first voltage regulator 108a is a high power voltage regulator (HPREG) and the first voltage domain input signal is a high voltage signal.

The second voltage regulator 108b is connected to the voltage controller 110, the second voltage domain 106b, the second voltage detector 112b, and the memory 118. The second voltage regulator 108b receives a second voltage regulator input signal and generates the second voltage domain input signal. In one embodiment, the second voltage regulator 108b is a low power voltage regulator (LPREG) and the second voltage domain input signal is a low voltage signal.

The first voltage detector 112a is connected to the voltage controller 110. The first voltage detector 112a receives the first voltage regulator input signal and determines a voltage level of the first voltage regulator input signal. The first voltage detector 112a generates a first voltage detector signal (hereinafter "$1^{st}$ VR_LVD signal") indicative of a voltage level of the first voltage regulator input signal. In one embodiment, the first voltage detector 112a compares the voltage level of the first voltage regulator input signal with a first threshold voltage level. When the voltage level of the first voltage regulator input signal is less than the first threshold voltage level, the first voltage detector 112a generates the $1^{st}$ VR_LVD signal at logic high state and when the voltage level of the first voltage regulator input signal is greater than the first threshold voltage level, the first voltage detector 112a generates the 1$^{st}$ VR_LVD signal at logic low state. In another embodiment, the first voltage detector 112a compares the voltage level of the first voltage regulator input signal with a second threshold voltage level. When the voltage level of the first voltage regulator input signal is greater than the second threshold voltage level, the first voltage detector 112a generates the 1$^{st}$ VR_LVD signal at logic high state and when the voltage level of the first voltage regulator input signal is less than the second threshold voltage level, the first voltage detector 112a generates the 1$^{st}$ VR_LVD signal at logic low state. The first voltage detector 112a compares the voltage level of the first voltage regulator input signal with the first and second threshold voltage levels. When the voltage level of the first voltage regulator input signal is greater than the first threshold voltage level and less than the second threshold voltage level, the first voltage detector 112a generates the 1$^{st}$ VR_LVD signal at logic low state.

The second voltage detector 112b is connected to the voltage controller 110. The second voltage detector 112b receives the second voltage regulator input signal and determines a voltage level of the second voltage regulator input signal. The second voltage detector 112b generates a second voltage detector signal (hereinafter "2$^{nd}$ VR_LVD signal") indicative of a voltage level of the second voltage regulator input signal. The second voltage detector 112b compares the voltage level of the second voltage regulator input signal with a third threshold voltage level. When the voltage level of the second voltage regulator input signal is less than the third threshold voltage level, the second voltage detector 112b generates the 2$^{nd}$ VR_LVD signal at logic high state and when the voltage level of the second voltage regulator input signal is greater than the third threshold voltage level, the second voltage detector 112b generates the 2$^{nd}$ VR_LVD signal at logic low state. In another embodiment, the second voltage detector 112b compares the voltage level of the second voltage regulator input signal with a fourth threshold voltage level. When the voltage level of the second voltage regulator input signal is greater than the fourth threshold voltage level, the second voltage detector 112b generates the 2$^{nd}$ VR_LVD signal at logic high state and when the voltage level of the second voltage regulator input signal is less than the fourth threshold voltage level, the second voltage detector 112b generates the 2$^{nd}$ VR_LVD signal at logic low state. In yet another embodiment, the second voltage detector 112b compares the voltage level of the second voltage regulator input signal with the third and fourth threshold voltage levels. When the voltage level of the second voltage regulator input signal is greater than the third threshold voltage level and less than the fourth threshold voltage level, the second voltage detector 112b generates the 2$^{nd}$ VR_LVD signal at logic low state.

The PMC voltage detector 114 is connected to the voltage controller 110. The PMC voltage detector 114 receives a PMC voltage supply (hereinafter "$V_{DD\_PMC}$ supply") and determines a voltage level of the $V_{DD\_PMC}$ supply. The PMC voltage detector 114 generates a PMC detector signal (hereinafter "PMC_LVD signal") indicative of a voltage level of the PMC_LVD signal. The PMC voltage detector 114 compares the voltage level of the PMC_LVD signal with a fifth threshold voltage level. When the voltage level of the $V_{DD\_PMC}$ supply is less than the fifth threshold voltage level, the PMC voltage detector 114 generates the PMC_LVD signal at logic high state and when the voltage level of the $V_{DD\_PMC}$ supply is greater than the fifth threshold voltage level, the PMC voltage detector 114 generates the PMC_LVD signal at logic low state.

The voltage controller 110 receives a set of input signals that includes a set of control signals. The voltage controller 110 receives the set of control signals from the voltage domains 106. The set of control signals includes first and second external power-on-reset (POR) signals (hereinafter "1$^{st}$ VR_POR_EXT signal" and "2$^{nd}$ VR_POR_EXT signal", respectively) and a test control signal. The 1$^{st}$ VR_POR_EXT signal is for resetting the first voltage domain 106a and the 2$^{nd}$ VR_POR_EXT signal is for resetting the second voltage domain 106b, while the test control signal is indicative of whether the IC 102 is operating in a test mode. In one example, the test control signal is at logic high state when the IC 102 is in the test mode and is at logic low state when the IC 102 is in a functional mode. The voltage controller 110 generates a master-reset-at-first-boot signal (hereinafter referred to as "MRFB signal"), a master-reset-in-functional-mode signal (hereinafter referred to as "MRFM signal"), and a level shifter enable signal (hereinafter referred to as "LS_EN signal"). The MRFB signal is indicative of resetting the voltage domains 106 when the voltage domains 106 are powered up. The MRFM signal is for resetting the voltage domains 106 when the IC 102 is in the functional mode. In one embodiment, the first and second voltage domains 106a and 106b are reset synchronously when at least one of the MRFB signal and the MRFM signal is high (i.e., at a logic high state). In one embodiment, the voltage controller 110 generates the LS_EN signal at a logic high state for enabling the level shifter 116, thereby facilitating communication between the PMC 104 and the voltage domains 106. The voltage controller 110 generates the LS_EN signal at a logic low state for disabling the level shifter 116, thereby blocking communication between the PMC 104 and the voltage domains 106.

Figure 2:
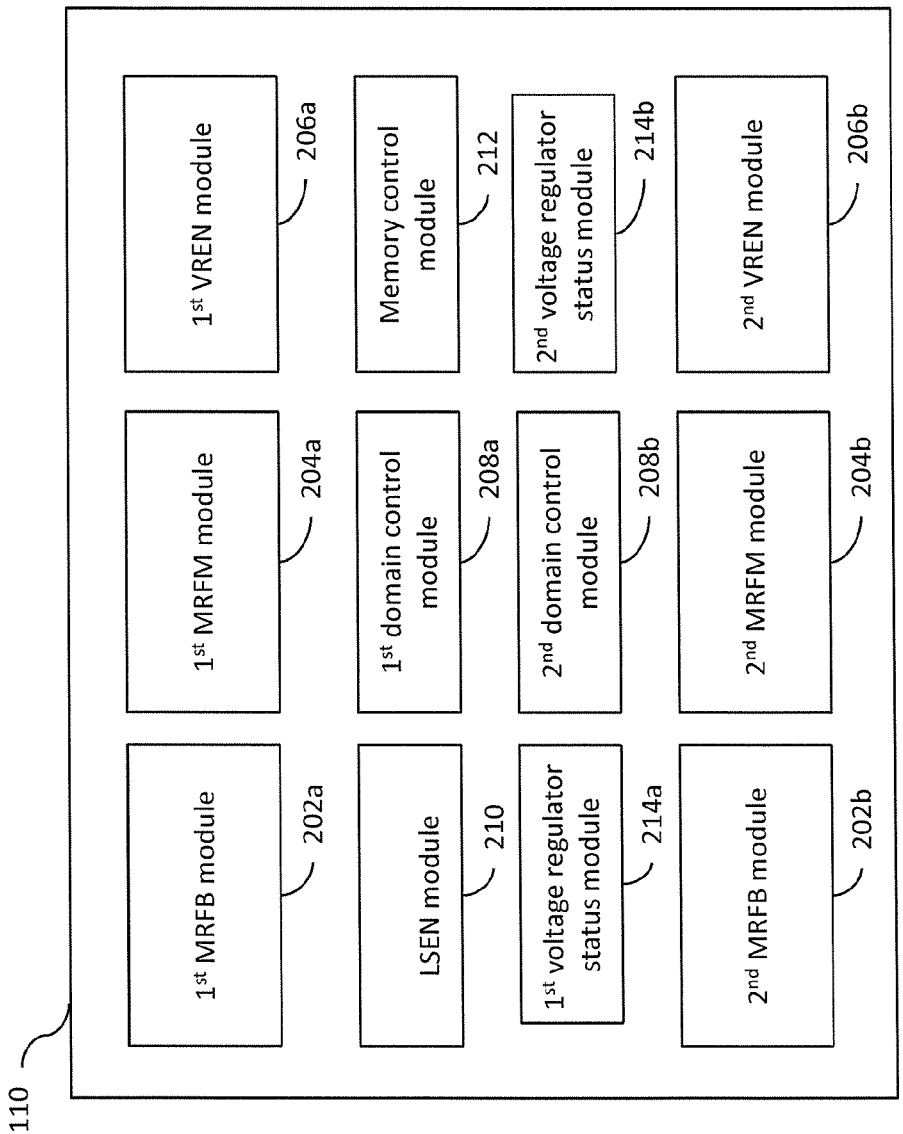
FIG. 2 is a schematic block diagram of a voltage controller in accordance with an embodiment of the present invention.

Referring now to FIG. 2, a schematic block diagram of the voltage controller 110 of FIG. 1 in accordance with an embodiment of the present invention is shown. The voltage controller 110 includes first and second master-reset-at-first-boot (MRFB) modules 202a and 202b, first and second master-reset-in-functional-mode (MRFM) modules 204a and 204b, first and second voltage regulator enable (VREN) modules 206a and 206b, first and second domain control modules 208a and 208b, a level shifter enable (LSEN) module 210, a memory control module 212, and first and second voltage regulator status modules 214a and 214b.

Figure 3:
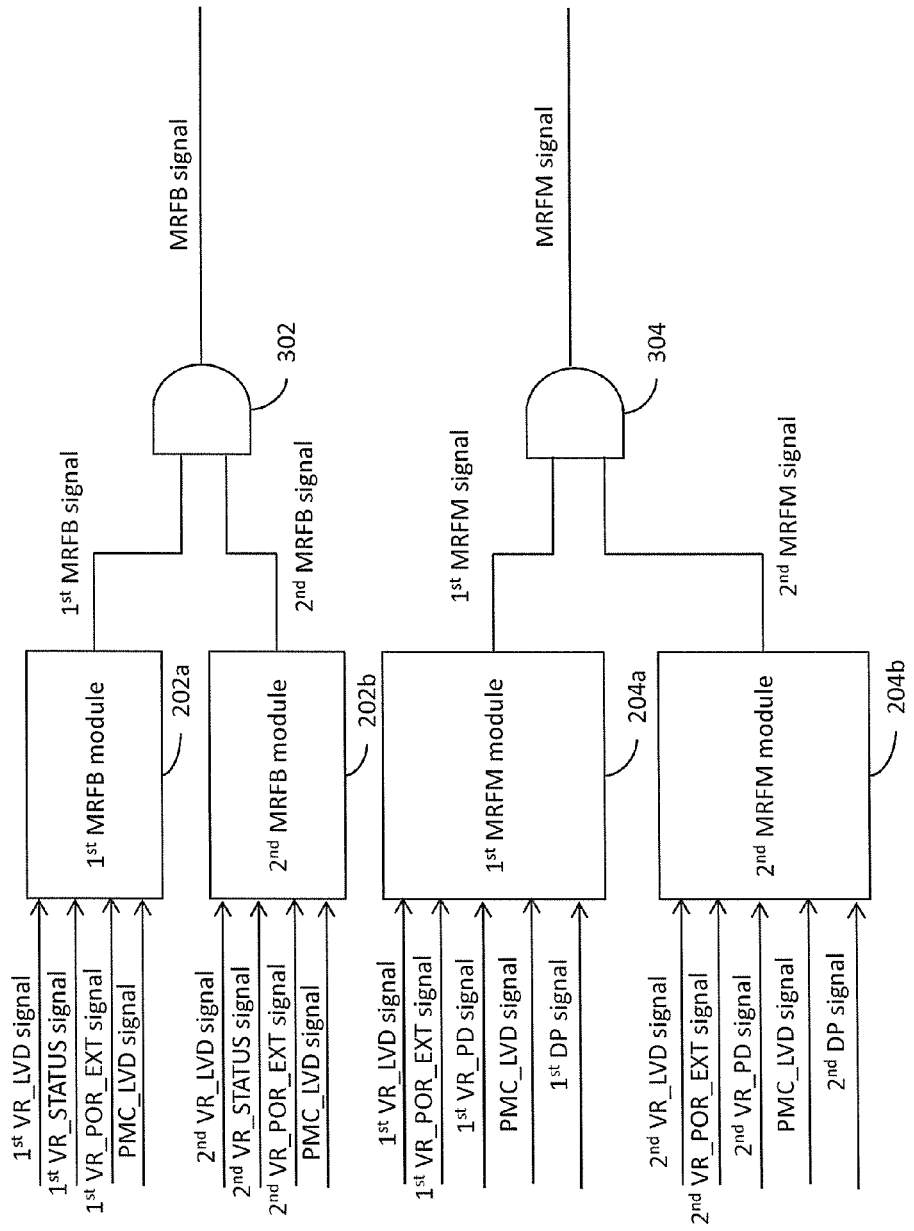
FIG. 3 is a schematic block diagram illustrating connections of modules of the voltage controller of FIG. 2 for generating master-reset-at-first-boot and master-reset-in-functional-mode signals in accordance with an embodiment of the present invention.

FIG. 3 is a schematic block diagram illustrating connections of the modules of the voltage controller 110 for generating the MRFB and MRFM signals in accordance with an embodiment of the present invention. The voltage controller 110 further includes first and second logic gates 302 and 304.

The first MRFB module 202a receives the 1$^{st}$ VR_LVD signal, a first voltage regulator status signal (hereinafter referred to as "1$^{st}$ VR_STATUS signal"), the 1$^{st}$ VR_POR_EXT signal, and the PMC_LVD signal and generates a first master-reset-at-first-boot signal (hereinafter referred to as "1$^{st}$ MRFB signal"). The 1$^{st}$ MRFB signal is indicative of resetting the first voltage domain 106a when the voltage domains 106 are powered up. The 1$^{st}$ VR_STATUS signal is indicative of whether the first voltage domain 106a is in a functional state, i.e., the 1$^{st}$ VR_STATUS signal is indicative of operational conditions of the first voltage domain 106a. In one embodiment, the 1$^{st}$ VR_STATUS signal is high when the first voltage domain 106a is in the functional state and is low when the first voltage domain 106a is powered down.

The second MRFB module 202b receives the $2^{nd}$ VR_LVD signal, a second voltage regulator status signal (hereinafter "$2^{nd}$ VR_STATUS signal"), the $2^{nd}$ VR_POR_EXT signal, and the PMC_LVD signal and generates a second master-reset-at-first-boot signal (hereinafter "$2^{nd}$ MRFB signal"). The $2^{nd}$ MRFB signal is indicative of resetting the second voltage domain 106b when the voltage domains 106 are powered up. The $2^{nd}$ VR_STATUS signal is indicative of whether the second voltage domain 106b is in a functional state, i.e., the $1^{st}$ VR_STATUS signal is indicative of operational conditions of the second voltage domain 106b. In one embodiment, the $2^{nd}$ VR_STATUS signal is high when the second voltage domain 106b is in the functional state and is low when the second voltage domain 106b is powered down.

The first MRFM module 204a receives the $1^{st}$ VR_LVD signal, the $1^{st}$ VR_POR_EXT signal, a first voltage regulator power down signal (hereinafter "$1^{st}$ VR_PD signal"), a first domain power signal (hereinafter "$1^{st}$ DP signal"), and the PMC_LVD signal, and generates a first master-reset-at-functional-mode signal (hereinafter $1^{st}$ MRFM signal). The $1^{st}$ MRFM signal is for resetting the first voltage domain 106a when the IC 102 is in the functional mode. The $1^{st}$ VR_PD signal is indicative of at least one of enable and disable statuses of the first voltage regulator 108a. In one embodiment, the $1^{st}$ VR_PD signal is high when the first voltage regulator 108a is disabled and is low when the first voltage regulator 108a is enabled.

The second MRFM module 204b receives the $2^{nd}$ VR_LVD signal, the $2^{nd}$ VR_POR_EXT signal, a second voltage regulator power down signal (hereinafter "$2^{nd}$ VR_PD signal"), a second domain power signal (hereinafter "$2^{nd}$ DP signal"), and the PMC_LVD signal, and generates a second master-reset-at-functional-mode signal (hereinafter "$2^{nd}$ MRFM signal"). The $2^{nd}$ MRFM signal is for resetting the second voltage domain 106b when the IC 102 is in the functional mode. The $2^{nd}$ VR_PD signal indicates either enable or disable status of the second voltage regulator 108b. In one embodiment, the $2^{nd}$ VR_PD signal is high when the second voltage regulator 108b is disabled and is low when the second voltage regulator 108b is enabled.

The first logic gate 302 has a first input terminal connected to the first MRFB module 202a for receiving the $1^{st}$ MRFB signal, a second input terminal connected to the second MRFB module 202b for receiving the $2^{nd}$ MRFB signal, and an output terminal for generating the MRFB signal.

Figure 4:
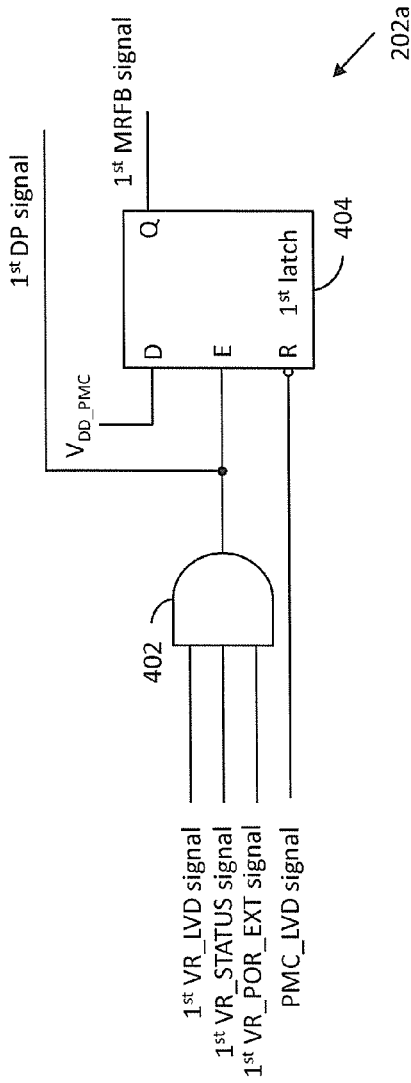
FIG. 4 is a schematic block diagram of a first master-reset-at-first-boot module of the voltage controller of FIG. 2 in accordance with an embodiment of the present invention.

The second logic gate 304 has a first input terminal connected to the first MRFM module 204a for receiving the $1^{st}$ MRFM signal, a second input terminal connected to the second MRFM module 204b for receiving the $2^{nd}$ MRFM signal, and an output terminal for generating the MRFM signal. In one embodiment, the first and second logic gates 302 and 304 are AND gates. It will be understood that where a specific gate type is mentioned, like AND gate, that means AND gate functionality but implementation may be by using other gates, e.g., NAND, NOR, XOR and NOT gates, etc. at the transistor level FIG. 4 is a schematic block diagram of the first MRFM module 202a in accordance with an embodiment of the present invention. The first MRFM module 202a includes a third logic gate 402 and a first latch 404.

The third logic gate 402 has a first input terminal for receiving the $1^{st}$ VR_LVD signal, a second input terminal for receiving the $1^{st}$ VR_STATUS signal, a third input terminal for receiving the $1^{st}$ VR_POR_EXT signal, and an output terminal for generating the $1^{st}$ DP signal. In one embodiment, the third logic gate 402 is an AND gate.

The first latch 404 has an input terminal for receiving the $V_{DD\_PMC}$ supply, an enable terminal connected to the output terminal of the third logic gate 402 for receiving the $1^{st}$ DP signal, a reset terminal for receiving the PMC_LVD signal, and an output terminal for generating the $1^{st}$ MRFB signal.

Figure 5:
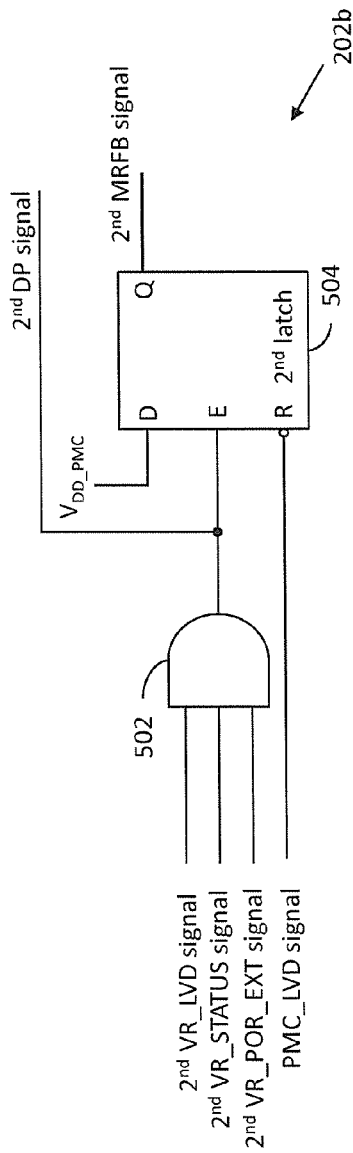
FIG. 5 is a schematic block diagram of a second master-reset-at-first-boot module of the voltage controller of FIG. 2 in accordance with an embodiment of the present invention.

FIG. 5 is a schematic block diagram of the second MRFM module 202b in accordance with an embodiment of the present invention. The second MRFM module 202b includes a fourth logic gate 502 and a second latch 504.

The fourth logic gate 502 has a first input terminal for receiving the $2^{nd}$ VR_LVD signal, a second input terminal for receiving the $2^{nd}$ VR_STATUS signal, a third input terminal for receiving the $2^{nd}$ VR_POR_EXT signal, and an output terminal for generating the $2^{nd}$ DP signal. In one embodiment, the fourth logic gate 502 is an AND gate.

The second latch 504 has an input terminal for receiving the $V_{DD\_PMC}$ supply, an enable terminal connected to the output terminal of the fourth logic gate 502 for receiving the $2^{nd}$ DP signal, a reset terminal for receiving the PMC_LVD signal, and an output terminal for generating the $2^{nd}$ MRFB signal.

FIG. 6 is a schematic block diagram of the first MRFM module 204a in accordance with an embodiment of the present invention. The first MRFM module 204a includes fifth through seventh logic gates 602-606 and a third latch 608.

The fifth logic gate 602 has a first input terminal for receiving the $1^{st}$ VR_LVD signal, a second input terminal for receiving the $1^{st}$ VR_POR_EXT signal, and an output terminal for generating a $1^{st}$ intermediate signal. The sixth logic gate 604 has a first input terminal for receiving the PMC_LVD signal, a second input terminal for receiving the $1^{st}$ VR_PD signal, and an output terminal for generating a $2^{nd}$ intermediate signal. In one embodiment, the fifth and sixth logic gates 602 and 604 are AND gates.

The third latch 608 has an input terminal for receiving the VDD_PMC supply, an enable terminal for receiving the $2^{nd}$ intermediate signal, a reset terminal for receiving the $1^{st}$ DP signal, and an output terminal for generating a 3rd intermediate signal.

The seventh logic gate 606 has a first input terminal connected to the output terminal of the fifth logic gate 602 for receiving the $1^{st}$ intermediate signal, a second input terminal connected to the output terminal of the third latch 608 for receiving the $3^{rd}$ intermediate signal, and an output terminal for generating the $1^{st}$ MRFM signal. In one embodiment, the seventh logic gate 606 is NAND gate.

FIG. 7 is a schematic block diagram of the second MRFM module 204b in accordance with an embodiment of the present invention. The second MRFM module 204b includes eighth through tenth logic gates 702-706 and a fourth latch 708.

The eighth logic gate 702 has a first input terminal for receiving the $2^{nd}$ VR_LVD signal, a second input terminal for receiving the $2^{nd}$ VR_POR_EXT signal, and an output terminal for generating a $4^{th}$ intermediate signal. The ninth logic gate 704 has a first input terminal for receiving the PMC_LVD signal, a second input terminal for receiving the $2^{nd}$ VR_PD signal, and an output terminal for generating a $5^{th}$ intermediate signal. In one embodiment, the eighth and ninth logic gates 702 and 704 are AND gates.

The fourth latch 708 has an input terminal for receiving the $V_{DD\_PMC}$ supply, an enable terminal for receiving the $5^{th}$ intermediate signal, a reset terminal for receiving the $2^{nd}$ DP signal, and an output terminal for generating a $6^{th}$ intermediate signal.

The tenth logic gate 706 has a first input terminal connected to the output terminal of the eighth logic gate 702 for receiving the $4^{th}$ intermediate signal, a second input terminal connected to the output terminal of the fourth latch 708 for receiving the $6^{th}$ intermediate signal, and an output terminal for generating the $2^{nd}$ MRFM signal. In one embodiment, the tenth logic gate 706 is NAND gate.

FIG. 8 is a schematic block diagram of the first VREN module 206a in accordance with an embodiment of the present invention. The first VREN module 206a includes first through third inverters 802-806 and eleventh through thirteenth logic gates 808-812.

The first inverter 802 receives the $1^{st}$ VR_POR_EXT signal and generates an inverted version of the $1^{st}$ VR_POR_EXT signal. The second inverter 804 receives a first voltage regulator enable signal (hereinafter referred to as "$1^{st}$ VR_EN signal") and generates an inverted version of the $1^{st}$ VR_EN signal. The third inverter 806 receives a PMC_LVD_LATCHED signal and generates an inverted version of the PMC_LVD_LATCHED signal. In one embodiment, the set of control signals received by the voltage controller 110 include the $1^{st}$ VR_EN signal. In one embodiment, the voltage controller 110 enables the first voltage regulator 108a after receiving the $1^{st}$ VR_EN signal at logic high state and disables the first voltage regulator 108a after receiving the $1^{st}$ VR_EN signal at logic low state.

The eleventh logic gate 808 has a first input terminal connected to the first inverter 802 for receiving the inverted version of the $1^{st}$ VR_POR_EXT signal, a second input terminal connected to the second inverter 804 for receiving the inverted version of the $1^{st}$ VR_EN signal, and an output terminal for generating a $7^{th}$ intermediate signal. In one embodiment, the eleventh logic gate 808 is NAND gate.

The twelfth logic gate 810 has a first input terminal connected to the output terminal of the eleventh logic gate 808 for receiving the $7^{th}$ intermediate signal, a second input terminal for receiving a first test signal, and an output terminal for generating an $8^{th}$ intermediate signal. In one embodiment, the twelfth logic gate 810 is AND gate. The first test signal is indicative of enabling the first voltage regulator 108a when the IC 102 is in the test mode. In one embodiment, the first and second voltage regulators 108a and 108b are disabled when the IC 102 is in the test mode. However, the voltage controller 110 enables the first voltage regulator 108a when the IC 102 is in the test mode and when the $1^{st}$ VREN module 206a receives the first test signal at logic high state. In one embodiment, the set of control signals received by the voltage controller 110 include the first test signal.

The thirteenth logic gate 812 has a first input terminal connected to the output terminal of the twelfth logic gate 810 for receiving the $8^{th}$ intermediate signal, a second input terminal connected to the third inverter 806 for receiving the inverted version of the PMC_LVD_LATCHED signal, and an output terminal for generating the $1^{st}$ VR_PD signal. In one embodiment, the thirteenth logic gate 812 is an OR gate. The $1^{st}$ VREN module 206a generates a high $1^{st}$ VR_PD signal for disabling the first voltage regulator 108a and at low state for enabling the first voltage regulator 108a.

In one embodiment, the first voltage regulator 108a receives the $1^{st}$ VR_PD signal. The first voltage regulator 108a is enabled after receiving the $1^{st}$ VR_PD signal at logic low state and is disabled after receiving the $1^{st}$ VR_PD signal at logic high state.

FIG. 9 is a schematic block diagram of the second VREN module 206b in accordance with an embodiment of the present invention. The second VREN module 206b includes fourth through sixth inverters 902-906 and fourteenth through sixteenth logic gates 908-912.

The fourth inverter 902 receives the $2^{nd}$ VR_POR_EXT signal and generates an inverted version of the $2^{nd}$ VR_POR_EXT signal. The fifth inverter 904 receives a second voltage regulator enable signal (hereinafter "$2^{nd}$ VR_EN signal") and generates an inverted version of the $2^{nd}$ VR_EN signal. The sixth inverter 906 receives the PMC_LVD_LATCHED signal and generates the inverted version of the PMC_LVD_LATCHED signal. In one embodiment, the set of control signals received by the voltage controller 110 includes the $2^{nd}$ VR_EN signal. In one embodiment, the voltage controller 110 enables the second voltage regulator 108b after receiving the $2^{nd}$ VR_EN signal at logic high state and disables the second voltage regulator 108b after receiving the $2^{nd}$ VR_EN signal at logic low state.

The fourteenth logic gate 908 has a first input terminal connected to the fourth inverter 902 for receiving the inverted version of the $2^{nd}$ VR_POR_EXT signal, a second input terminal connected to the fifth inverter 904 for receiving the inverted version of the $2^{nd}$ VR_EN signal, and an output terminal for generating a $9^{th}$ intermediate signal. In one embodiment, the fourteenth logic gate 908 is a NAND gate.

The fifteenth logic gate 910 has a first input terminal connected to the output terminal of the fourteenth logic gate 908 for receiving the $9^{th}$ intermediate signal, a second input terminal for receiving a second test signal, and an output terminal for generating a $10^{th}$ intermediate signal. In one embodiment, the fifteenth logic gate 910 is an AND gate. The second test signal is indicative of disabling the second voltage regulator 108b when the IC 102 is in the test mode. In one embodiment, the first and second voltage regulators 108a and 108b are switched OFF when the IC 102 is in the test mode. However, the voltage controller 110 enables the second voltage regulator 108b when the IC 102 is in the test mode and when the $2^{nd}$ VREN module 206b receives the second test signal at logic high state. In one embodiment, the set of control signals received by the voltage controller 110 includes the second test signal.

The sixteenth logic gate 912 has a first input terminal connected to the output terminal of the fifteenth logic gate 910 for receiving the $10^{th}$ intermediate signal, a second input terminal connected to the sixth inverter 906 for receiving the inverted version of the PMC_LVD_LATCHED signal, and an output terminal for generating the $2^{nd}$ VR_PD signal. In one embodiment, the sixteenth logic gate 912 is OR gate. In one embodiment, the $2^{nd}$ VREN module 206b generates the $2^{nd}$ VR_PD signal at logic high state for disabling the second voltage regulator 108b and at logic low state for enabling the second voltage regulator 108b.

In one embodiment, the second voltage regulator 108b receives the $2^{nd}$ VR_PD signal. The second voltage regulator 108b is enabled after receiving the $2^{nd}$ VR_PD signal at logic low state and is disabled after receiving the $2^{nd}$ VR_PD signal at logic high state.

Figure 10:
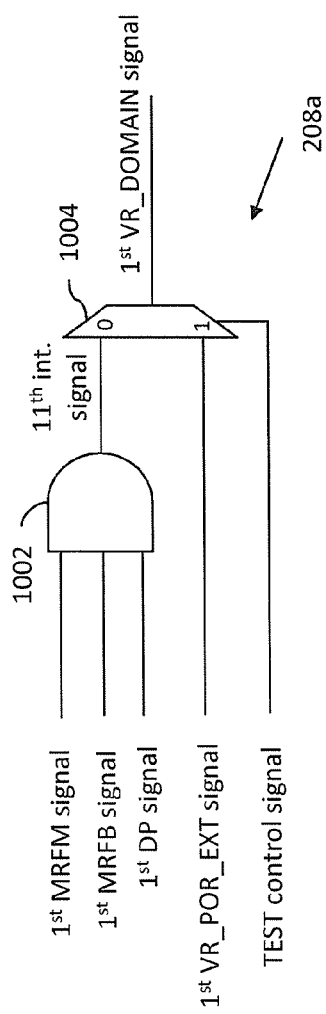
FIG. 10 is a schematic block diagram of a first domain control module of the voltage controller of FIG. 2 in accordance with an embodiment of the present invention.

FIG. 10 is a schematic block diagram of the first domain control module 208a in accordance with an embodiment of the present invention. The first domain control module includes a seventeenth logic gate 1002 and a first multiplexer 1004.

The seventeenth logic gate 1002 has a first input terminal connected to the first MRFM module 204a for receiving the $1^{st}$ MRFM signal, a second input terminal connected to the first MRFB module 202a for receiving the 1$^{st}$ MRFB signal, a third input terminal connected to the first MRFB module 202a for receiving the 1$^{st}$ DP signal, and an output terminal for generating an 11$^{th}$ intermediate signal. In one embodiment, the seventeenth logic gate 1002 is an AND gate.

The first multiplexer 1004 has a first input terminal connected to the output terminal of the seventeenth logic gate 1002 for receiving the 11$^{th}$ intermediate signal, a second input terminal for receiving the 1$^{st}$ VR_POR_EXT signal, a select terminal for receiving the test control signal, and an output terminal for outputting at least one of the 11$^{th}$ intermediate signal and the 1$^{st}$ VR_POR_EXT signal as a first domain signal (1$^{st}$ VR_DOMAIN signal). The 1$^{st}$ VR_DOMAIN signal indicates whether a power supply to the first domain 106a is stable.

Figure 11:
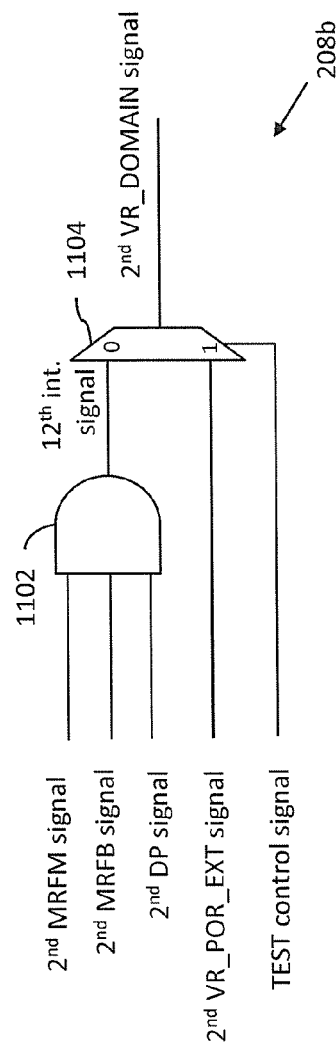
FIG. 11 is a schematic block diagram of a second domain control module of the voltage controller of FIG. 2 in accordance with an embodiment of the present invention.

FIG. 11 is a schematic block diagram of the second domain control module 208b in accordance with an embodiment of the present invention. The second domain control module includes an eighteenth logic gate 1102 and a second multiplexer 1104.

The eighteenth logic gate 1102 has a first input terminal connected to the second MRFM module 204b for receiving the 2$^{nd}$ MRFM signal, a second input terminal connected to the second MRFB module 202b for receiving the 2$^{nd}$ MRFB signal, a third input terminal connected to the second MRFB module 202b for receiving the 2$^{nd}$ DP signal, and an output terminal for generating a 12$^{th}$ intermediate signal. In one embodiment, the eighteenth logic gate 1102 is an AND gate.

The second multiplexer 1104 has a first input terminal connected to the output terminal of the eighteenth logic gate 1102 for receiving the 12$^{th}$ intermediate signal, a second input terminal for receiving the 2$^{nd}$ VR_POR_EXT signal, a select terminal for receiving the test control signal, and an output terminal for outputting at least one of the 12$^{th}$ intermediate signal and the 2$^{nd}$ VR_POR_EXT signal as a second domain signal (2$^{nd}$ VR_DOMAIN signal). The 2$^{nd}$ VR_DOMAIN signal indicates whether a power supply to the second domain 106b is stable.

Figure 12:
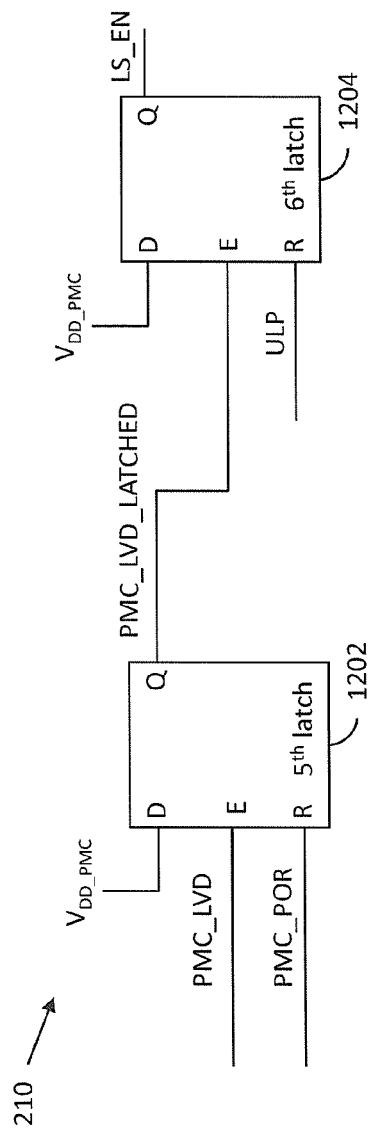
FIG. 12 is a schematic block diagram of a level shifter enable module of the voltage controller of FIG. 2 in accordance with an embodiment of the present invention.

FIG. 12 is a schematic block diagram of LSEN module 210 in accordance with an embodiment of the present invention. The LSEN module 210 includes fifth and sixth latches 1202 and 1204.

The fifth latch 1202 has an input terminal for receiving the VDD_PMC supply, an enable terminal for receiving the PMC_LVD signal, a reset terminal for receiving a PMC_POR signal, and an output terminal for generating the PMC_LVD_LATCHED signal. The PMC_POR signal is indicative of resetting the PMC 104.

The sixth latch 1204 has an input terminal for receiving the VDD_PMC supply, an enable terminal connected to the output terminal of the fifth latch 1202 for receiving the PMC_LVD_LATCHED signal, and an output terminal for generating the LS_EN signal.

Figure 13:
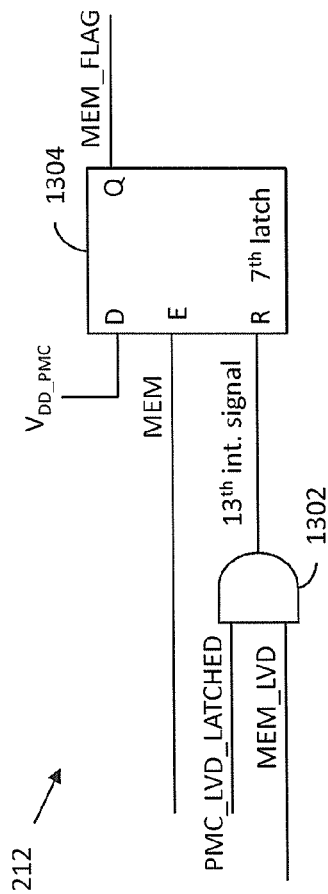
FIG. 13 is a schematic block diagram of a memory control module of the voltage controller of FIG. 2 in accordance with an embodiment of the present invention.
Figure 16A:
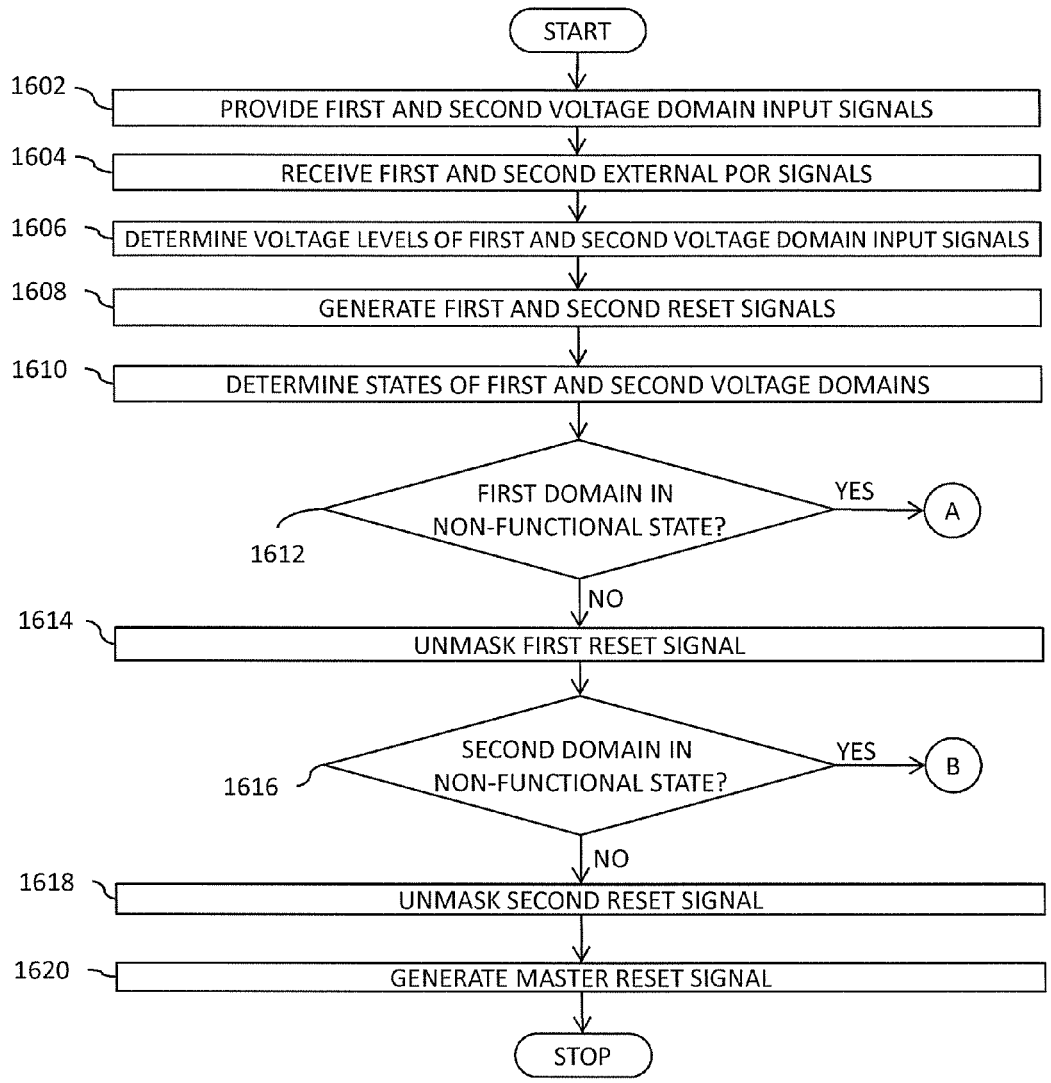
FIGS. 16A-16D are a flow chart illustrating a method for resetting a plurality of voltage domains of an IC in accordance with an embodiment of the present invention.
Figure 16B:
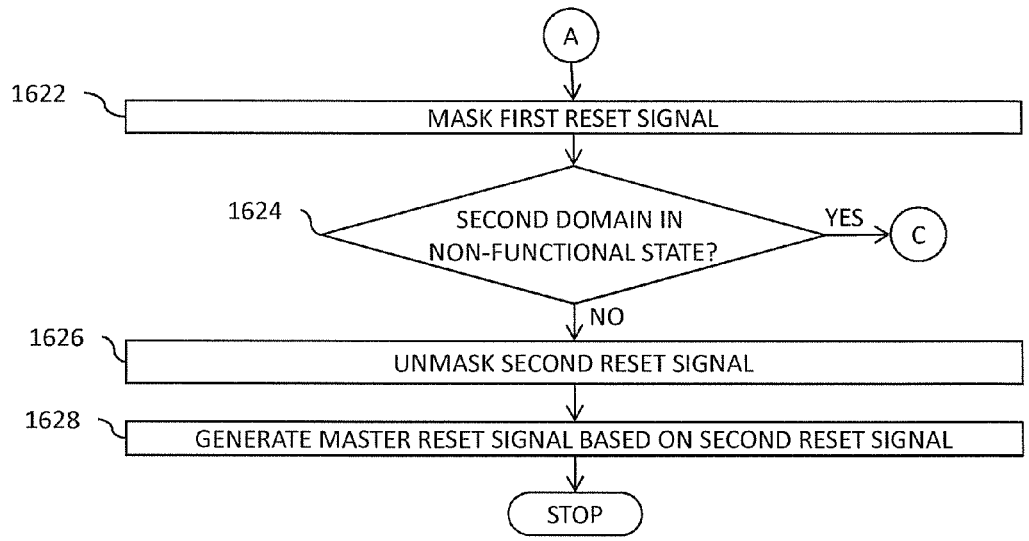
Figure 16C:
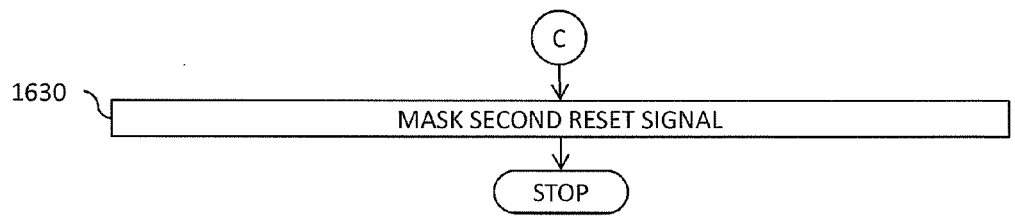
Figure 16D:
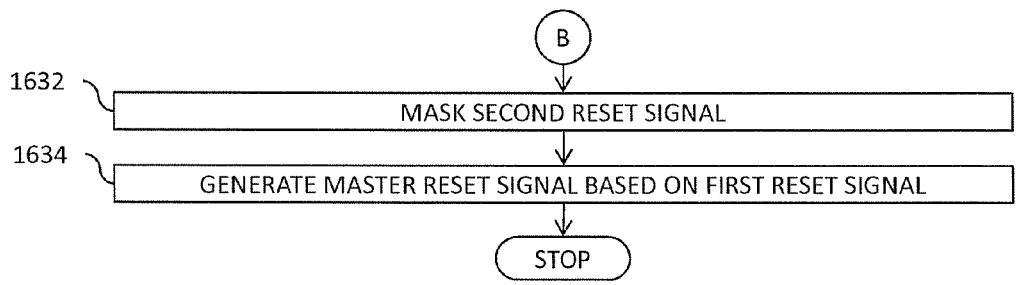

FIG. 13 is a schematic block diagram of the memory control module 212 in accordance with an embodiment of the present invention. The memory control module 212 includes a nineteenth logic gate 1302 and a seventh latch 1304.

The memory 118 receives the second voltage domain input signal and stores data. In one embodiment, the second voltage domain input signal is a low voltage signal. When the voltage level of the second voltage domain input signal falls below a sixth threshold voltage level, the data stored in the memory 118 becomes corrupt. In one embodiment, the second voltage detector 112b compares the voltage level of the second voltage domain input signal with the sixth threshold voltage level. When the voltage level of the second voltage domain input signal is less than the sixth threshold voltage level, the second voltage detector 112b generates a memory detector signal (MEM_LVD signal). The MEM_LVD signal indicates whether the data stored in the memory 118 is corrupt. If the data stored in the memory 118 is corrupt, a refreshing circuit (not shown) in the IC 102 refreshes the data stored in the memory 118.

The nineteenth logic gate 1302 has a first input terminal connected to the output terminal of the fifth latch 1202 for receiving the PMC_LVD_LATCHED signal, a second input terminal for receiving the MEM_LVD signal, and an output terminal for generating a 13$^{th}$ intermediate signal.

The seventh latch 1304 has an input terminal for receiving the $V_{DD\_PMC}$ supply, an enable terminal for receiving a memory signal (MEM signal), and an output terminal for generating a memory flag signal (MEM_FLAG signal). The MEM_FLAG signal indicates whether the data stored in the memory 118 is corrupt. In one embodiment, a logic high state of the MEM_FLAG signal indicates that the data stored in the memory 118 is corrupt and a logic low state of the MEM_FLAG signal indicates that the data stored in the memory 118 is not corrupt. The MEM signal indicates whether the data is stored in the memory 118. The MEM signal is generated by the voltage domains 106 at logic high state when the data is stored in the memory 118.

FIG. 14 is a schematic block diagram of the first voltage regulator status module 214a in accordance with an embodiment of the present invention. The first voltage regulator status module 214a includes a seventh inverter 1402 and a twentieth logic gate 1404.

The seventh inverter 1402 receives a first voltage regulator unmasked status signal (hereinafter "1$^{st}$ VR_UNMASKED_STATUS signal") and generates an inverted version of the 1$^{st}$ VR_UNMASKED_STATUS signal. The 1$^{st}$ VR_UNMASKED_STATUS signal indicates that the 1$^{st}$ voltage domain input signal is stable.

The twentieth logic gate 1404 has a first input terminal for receiving the 1$^{st}$ VR_PD signal, a second input terminal connected to the seventh inverter 1402 for receiving the inverted version of the 1$^{st}$ VR_UNMASKED_STATUS signal, and an output terminal for generating the 1$^{st}$ VR_STATUS signal.

FIG. 15 is a schematic block diagram of the second voltage regulator status module 214b in accordance with an embodiment of the present invention. The second voltage regulator status module 214b includes an eighth inverter 1502 and a twenty-first logic gate 1504.

The eighth inverter 1502 receives a second voltage regulator unmasked status signal (hereinafter "2$^{nd}$ VR_UNMASKED_STATUS signal") and generates an inverted version of the 2$^{nd}$ VR_UNMASKED_STATUS signal. The 2$^{nd}$ VR_UNMASKED_STATUS signal indicates that the 2$^{nd}$ voltage domain input signal is stable.

The twenty-first logic gate 1504 has a first input terminal for receiving the 2$^{nd}$ VR_PD signal, a second input terminal connected to the eighth inverter 1502 for receiving the inverted version of the 2$^{nd}$ VR_UNMASKED_STATUS signal, and an output terminal for generating the 2$^{nd}$ VR_STATUS signal.

In operation, the PMC 104 receives the set of control signals, the 1$^{st}$ and 2$^{nd}$ voltage regulator input signals, and the 1$^{st}$ and 2$^{nd}$ VR_POR_EXT signals, and generates the 1$^{st}$ and 2$^{nd}$ voltage domain input signals. The PMC 104 detects and monitors the voltage levels of the 1$^{st}$ and 2$^{nd}$ voltage regulator input signals. The PMC 104 further generates the MRFB and MRFM signals based on the voltage levels of the 1$^{st}$ and 2$^{nd}$ voltage regulator input signals and the 1$^{st}$ and 2$^{nd}$ VR_POR_EXT signals. The PMC 104 further generates the level-shifted MRFB and level-shifted MRFM signals based on the MRFB and MRFM signals, respectively. The voltage domains 106 receive the level-shifted MFRB signal when the voltage domains 106 are powered up. The IC 102 resets the first and second voltage domains 106a and 106b synchronously after receiving the level-shifted MFRB signal. The voltage domains 106 receive the level-shifted MRFM signal when the IC 102 is in the functional mode. The IC 102 resets the first and second voltage domains 106a and 106b synchronously after receiving the level-shifted MFRM signal.

Therefore, the first and second voltage domains 106a and 106b are reset synchronously based on the MRFB and MRFM signals, thereby preventing the IC 102 from being corrupt due to non-synchronous resetting of the voltage domains 106. In one embodiment, the voltage domains 106 include multiple voltage domains including the first and second voltage domains 106a and 106b. The PMC 104 generates multiple reset signals corresponding to voltage domains 106, wherein each reset signal corresponds to a voltage domain of the voltage domains 106. The PMC 104 generates the MRFB and MRFM signal based on the multiple reset signals, thereby resetting the voltage domains 106 synchronously. Hence, the PMC 104 provides flexibility to an operator to connect an IC including one or more than one voltage domains with the PMC 104.

Referring now to FIGS. 16A-16D, a flow chart illustrating a method for resetting the voltage domains 106 of the IC 102 in accordance with an embodiment of the present invention is shown.

At step 1602, the PMC 104 provides the first and second voltage domain input signals to the voltage domains 106. At step 1604, the PMC 104 receives the $1^{st}$ VR_POR_EXT and $2^{nd}$ VR_POR_EXT signals. At step 1606, the PMC 104 determines the voltage levels of the first and second voltage domain input signals. At step 1608, the PMC 104 generates first and second reset signals based on the voltage levels of the first and second voltage domain input signals, respectively. The first and second reset signals are indicative of resetting the first and second voltage domains 106a and 106b, respectively. At step 1610, the PMC 104 determines a state of the first and second voltage domains 106a and 106b. At step 1612, the PMC 104 checks to determine whether the first domain 106a is in a non-functional state. If at step 1612, the PMC 104 determines that the first domain 106a is in a functional state, the PMC 104 executes step 1614. However, if at step 1612, the PMC 104 determines that the first domain 106a is in the non-functional state, the PMC 104 executes step 1622. At step 1614, the PMC 104 un-masks the first reset signal. At step 1616, the PMC 104 checks to determine whether the second domain 106b is in the non-functional state. If at step 1616, the PMC 104 determines that the second domain 106b is in the functional state, the PMC 104 executes step 1618. However, if at step 1616, the PMC 104 determines that the second domain 106b is in the non-functional state, the PMC 104 executes step 1632. At step 1618, the PMC 104 unmasks the second reset signal. At step 1620, the PMC 104 generates a master reset signal based on the first and second reset signals. The master reset signal is indicative of resetting the voltage domains 106.

At step 1622, the PMC 104 masks the first reset signal. At step 1624, the PMC 104 checks to determine whether the second domain 106b is in the non-functional state. If at step 1624, the PMC 104 determines that the second domain 106b is in the functional state, the PMC 104 executes step 1626. However, if at step 1624, the PMC 104 determines that the second domain 106b is in the non-functional state, the PMC 104 executes step 1630. At step 1626, the PMC 104 unmasks the second reset signal. At step 1628, the PMC 104 generates the master reset signal based on the second reset signal.

At step 1630, the PMC 104 masks the second reset signal.

At step 1632, the PMC 104 masks the second reset signal. At step 1634, the PMC 104 generates the master reset signal based on the first reset signal.

It will be understood by those of skill in the art that the PMC 104 may not be included in the IC 102 and can be coupled externally to the IC 102.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention. No element, act, or instruction used in the present application should be construed as critical or essential to the invention unless explicitly described as such.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A power management controller (PMC) connected to a memory and a plurality of voltage domains of an integrated circuit including first and second voltage domains, wherein the first and second voltage domains receive first and second voltage domain input signals, respectively, and wherein the memory receives a memory input signal, the PMC comprising:
   first and second voltage regulators that receive first and second voltage regulator input signals, respectively, and generate the first and second voltage domain input signals, respectively;
   first and second voltage detectors, connected to the first and second voltage regulators, respectively, for receiving and monitoring the first and second voltage regulator input signals, respectively, and generating first and second voltage detector signals indicative of voltage levels of the first and second voltage regulator input signals, respectively; and
   a voltage controller connected to the first and second voltage regulators and the first and second voltage detectors, wherein the voltage controller is configured for:
      receiving a set of input signals including the first and second voltage detector signals, first and second external power-on-reset (POR) signals indicative of resetting the first and second voltage domains, respectively, and first and second regulator status signals indicative of operational conditions of the first and second voltage regulators, respectively, and
      generating a master reset signal based on the set of input signals, wherein the master reset signal is indicative of resetting the first and second voltage domains.

2. The power management controller of claim 1, further comprising:
   a PMC voltage detector, connected to the voltage controller, for receiving a PMC voltage supply and generating a PMC detector signal indicative of a voltage level of the PMC voltage supply, wherein the set of input signals includes the PMC detector signal; and a level shifter, connected to the voltage controller, for receiving a level shifted enable signal, a master-reset-at-first-boot signal, and a master-reset-in-functional-mode signal, and generating level-shifted master-reset-at-first-boot and level-shifted master-reset-in-functional-mode signals, respectively.

3. The power management controller of claim 2, wherein the voltage controller comprises:

a first master-reset-at-first-boot module, connected to the first voltage regulator, the first voltage detector, and the PMC voltage detector, that receives the first voltage detector signal, the first external POR signal, the first regulator status signal, and the PMC detector signal, and generates a first master-reset-at-first-boot signal and a first domain power signal;

a second master-reset-at-first-boot module, connected to the second voltage regulator, the second voltage detector, and the PMC voltage detector, that receives the second voltage detector signal, the second external POR signal, the second regulator status signal, and the PMC detector signal, and generates a second master-reset-at-first-boot signal and a second domain power signal;

a first master-reset-in-functional-mode module, connected to the first master-reset-at-first-boot module, the first voltage detector, and the PMC voltage detector, that receives the first voltage detector signal, the first external POR signal, the PMC detector signal, the first domain power signal, and a first voltage regulator power down signal indicative of at least one of enable and disable statuses of the first voltage regulator, and generates a first master-reset-in-functional-mode signal;

a second master-reset-in-functional-mode module, connected to the second master-reset-at-first-boot module, the second voltage detector, and the PMC voltage detector, that receives the second voltage detector signal, the second external POR signal, the PMC detector signal, the second domain power signal, and a second voltage regulator power down signal indicative of at least one of enable and disable statuses of the second voltage regulator, and generates a second master-reset-in-functional-mode signal;

a first logic gate having a first input terminal connected to the first master-reset-at-first-boot module for receiving the first master-reset-at-first-boot signal, a second input terminal connected to the second master-reset-at-first-boot module for receiving the second master-reset-at-first-boot signal, and an output terminal for generating the master-reset-at-first-boot signal, wherein the master reset signal is the master-reset-at-first-boot signal when the first and second voltage domains boot; and a second logic gate having a first input terminal connected to the first master-reset-in-functional-mode module for receiving the first master-reset-in-functional-mode signal, a second input terminal connected to the second master-reset-in-functional-mode module for receiving the second master-reset-in-functional-mode signal, and an output terminal for generating the master-reset-in-functional-mode signal, wherein the master reset signal is the master-reset-in-functional-mode signal when the first and second voltage domains are in a functional mode.

4. The power management controller of claim 3, wherein the voltage controller further comprises:

a first voltage regulator enable module that receives the first external POR signal, a first regulator enable signal indicative of at least one of the enable and disable statuses of the first voltage regulator, a first test signal indicative of at least one of the enable and disable statuses of the first voltage regulator during a test mode, and a latched PMC detector signal, and generates the first voltage regulator power down signal;

a second voltage regulator enable module that receives the second external POR signal, a second regulator enable signal indicative of at least one of the enable and disable statuses of the second voltage regulator, a second test signal indicative of at least one of the enable and disable statuses of the second voltage regulator during the test mode, and the latched PMC detector signal, and generates the second voltage regulator power down signal;

a level shifter enable module, connected to the PMC voltage detector, that receives the PMC detector signal, an ultra-low power signal, and a PMC external POR signal, and generates the level shifter enable signal indicative of at least one of enable and disable statuses of the level shifter; and a memory control module, connected to the level shifter enable module, that receives the latched PMC detector signal, a memory low voltage detector signal indicative of a voltage level of the memory input signal, and a memory signal, and generates a memory flag signal, wherein the memory flag signal is indicative of at least one of a corrupt state and an operational state of the memory.

5. The power management controller of claim 4, wherein the first master-reset-at-first-boot module comprises:

a third logic gate having a first input terminal for receiving the first voltage detector signal, a second input terminal for receiving the first regulator status signal, a third input terminal for receiving the first external POR signal, and an output terminal for generating the first domain power signal; and a first latch having an input terminal connected to the PMC voltage supply, an enable terminal connected to the output terminal of the third logic gate for receiving the first domain power signal, a reset terminal for receiving the PMC detector signal, and an output terminal for generating the first master-reset-at-first-boot signal.

6. The power management controller of claim 5, wherein the second master-reset-at-first-boot module comprises:

a fourth logic gate having a first input terminal for receiving the second voltage detector signal, a second input terminal for receiving the second regulator status signal, a third input terminal for receiving the second external POR signal, and an output terminal for generating the second domain power signal; and a second latch having an input terminal connected to the PMC voltage supply, an enable terminal connected to the output terminal of the fourth logic gate for receiving the second domain power signal, a reset terminal for receiving the PMC detector signal, and an output terminal for generating the second master-reset-at-first-boot signal.

7. The power management controller of claim 6, wherein the first master-reset-in-functional-mode module comprises:

a fifth logic gate having a first input terminal for receiving the first voltage detector signal, a second input terminal for receiving the first external POR signal, and an output terminal for generating a first intermediate signal;

a sixth logic gate having a first input terminal for receiving the PMC detector signal, a second input terminal for receiving the first voltage regulator power down signal, and an output terminal for generating a second intermediate signal;

a third latch having an input terminal connected to the PMC voltage supply, an enable terminal connected to the output terminal of the sixth logic gate for receiving the second intermediate signal, a reset terminal for receiving the first domain power signal, and an output terminal for generating a third intermediate signal; and a seventh logic gate having a first input terminal connected to the output terminal of the fifth logic gate for receiving the first intermediate signal, a second input terminal connected to the output terminal of the third latch for receiving the third intermediate signal, and an output terminal for generating the first master-reset-in-functional-mode signal.

8. The power management controller of claim 7, wherein the second master-reset-in-functional-mode module comprises:

an eighth logic gate having a first input terminal for receiving the second voltage detector signal, a second input terminal for receiving the second external POR signal, and an output terminal for generating a fourth intermediate signal;

a ninth logic gate having a first input terminal for receiving the PMC detector signal, a second input terminal for receiving the second voltage regulator power down signal, and an output terminal for generating a fifth intermediate signal;

a fourth latch having an input terminal connected to the PMC voltage supply, an enable terminal connected to the output terminal of the ninth logic gate for receiving the fifth intermediate signal, a reset terminal for receiving the second domain power signal, and an output terminal for generating a sixth intermediate signal; and a tenth logic gate having a first input terminal connected to the output terminal of the eighth logic gate for receiving the fourth intermediate signal, a second input terminal connected to the output terminal of the fourth latch for receiving the sixth intermediate signal, and an output terminal for generating the second master-reset-in-functional-mode signal.

9. The power management controller of claim 8, wherein the first voltage regulator enable module comprises:

an eleventh logic gate having a first input terminal for receiving an inverted version of the first external POR signal, a second input terminal for receiving an inverted version of the first voltage regulator enable signal, and an output terminal for generating a seventh intermediate signal;

a twelfth logic gate having a first input terminal connected to the output terminal of the eleventh logic gate for receiving the seventh intermediate signal, a second input terminal for receiving the first signal, and an output terminal for generating an eighth intermediate signal; and a thirteenth logic gate having a first input terminal connected to the output terminal of the twelfth logic gate for receiving the eighth intermediate signal, a second input terminal for receiving an inverted version of the latched PMC detector signal, and an output terminal for generating the first voltage regulator power down signal.

10. The power management controller of claim 9, wherein the second voltage regulator enable module comprises:

a fourteenth logic gate having a first input terminal for receiving an inverted version of the second external POR signal, a second input terminal for receiving an inverted version of the second voltage regulator enable signal, and an output terminal for generating a ninth intermediate signal;

a fifteenth logic gate having a first input terminal connected to the output terminal of the fourteenth logic gate for receiving the ninth intermediate signal, a second input terminal for receiving the second test signal, and an output terminal for generating a tenth intermediate signal; and a sixteenth logic gate having a first input terminal connected to the output terminal of the fifteenth logic gate for receiving the tenth intermediate signal, a second input terminal for receiving the inverted version of the latched PMC detector signal, and an output terminal for generating the second voltage regulator power down signal.

11. The power management controller of claim 10, further comprising:

a first domain control module, comprising:
  a seventeenth logic gate having a first input terminal for receiving the first master-reset-in-functional-mode signal, a second input terminal for receiving the first master-reset-at-first-boot signal, a third input terminal for receiving the first domain power signal, and an output terminal for generating an eleventh intermediate signal; and
  a first multiplexer having a first input terminal connected to the output terminal of the seventeenth logic gate for receiving the eleventh intermediate signal, a second input terminal for receiving the first external POR signal, a select terminal for receiving the test signal, and an output terminal for transmitting at least one of the eleventh intermediate signal and the first external POR signal as a first domain signal based on the test signal; and a second domain control module, comprising:
  an eighteenth logic gate having a first input terminal for receiving the second master-reset-in-functional-mode signal, a second input terminal for receiving the second master-reset-at-first-boot signal, a third input terminal for receiving the second domain power signal, and an output terminal for generating a twelfth intermediate signal; and
  a second multiplexer having a first input terminal connected to the output terminal of the eighteenth logic gate for receiving the twelfth intermediate signal, a second input terminal for receiving the second external POR signal, a select terminal for receiving the test signal, and an output terminal for transmitting at least one of the twelfth intermediate signal and the second external POR signal as a second domain signal based on the test signal.

12. The power management controller of claim 11, wherein the level shifter enable module comprises:

a fifth latch having an input terminal connected to the PMC voltage supply, an enable terminal for receiving the PMC detector signal, a reset terminal for receiving the PMC external POR signal, and an output terminal for generating the latched PMC detector signal; and a sixth latch having an input terminal connected to the PMC voltage supply, an enable terminal connected to the output terminal of the fifth latch for receiving the latched PMC detector signal, a reset terminal for receiving an ultra-low power signal, and an output terminal for generating the level shifter enable signal, wherein the ultra-low power signal is a voltage signal at a low voltage level.

13. The power management controller of claim 12, wherein the memory control module comprises:
a nineteenth logic gate having a first input terminal for receiving the latched PMC detector signal, a second input terminal for receiving the memory low voltage detector signal, and an output terminal for generating a thirteenth intermediate signal; and
a seventh latch having an input terminal connected to the PMC voltage supply, an enable terminal for receiving the memory signal, a reset terminal connected to the output terminal of the nineteenth logic gate for receiving the thirteenth intermediate signal, and an output terminal for generating the memory flag signal.

14. The power management controller of claim 13, further comprising:
a first voltage regulator status module that comprises a twentieth logic gate having a first input terminal for receiving the first voltage regulator power down signal, a second input terminal for receiving an inverted version of a first unmasked status signal indicative of an operational state of the first voltage domain, and an output terminal for generating the first regulator status signal; and
a second voltage regulator status module that comprises a twenty-first logic gate having a first input terminal for receiving the second voltage regulator power down signal, a second input terminal for receiving an inverted version of a second unmasked status signal indicative of an operational state of the second voltage domain, and an output terminal for generating the second regulator status signal.

15. A method for resetting a plurality of voltage domains including first and second voltage domains of an integrated circuit, the method comprising:

providing first and second voltage domain input signals to the first and second voltage domains, respectively;
receiving first and second external power-on-reset (POR) signals indicative of resetting the first and second voltage domains, respectively;
determining voltage levels of the first and second voltage domain input signals;
generating first and second reset signals based on the first and second external POR signals and the voltage levels of the first and second voltage domain input signals, wherein the first and second reset signals are indicative of resetting the first and second voltage domains, respectively; and
generating a master reset signal based on the first and second reset signals, wherein the master reset signal is indicative of resetting the first and second voltage domains.

16. The method of claim 15, further comprising:
determining states of the first and second voltage domains to be at least one of functional and non-functional states;
masking the first and second reset signals when the first and second voltage domains are in the non-functional state; and
unmasking the first and second reset signals when the first and second voltage domains are in the functional state.

17. The method of claim 16, further comprising:
receiving a set of control signals from the first and second voltage domains;
receiving a power management controller (PMC) voltage supply;
determining if a voltage level of the PMC voltage supply is within a first operable range, wherein the first operable range includes a set of operable voltage levels of the PMC voltage supply; and
blocking the set of control signals when the voltage level of the PMC voltage supply is not within the first operable range.

* * * * *